United States Patent [19]

Prater

[11] Patent Number: 5,654,537

[45] Date of Patent: Aug. 5, 1997

[54] IMAGE SENSOR ARRAY WITH PICTURE ELEMENT SENSOR TESTABILITY

[75] Inventor: James S. Prater, Fort Collins, Colo.

[73] Assignee: Symbios Logic Inc., Fort Collins, Colo.

[21] Appl. No.: 496,861

[22] Filed: Jun. 30, 1995

[51] Int. Cl.⁶ .................................................. H01J 40/14
[52] U.S. Cl. ............................................ 250/208.1; 348/313
[58] Field of Search .................................. 250/208.1, 214.1, 250/214 R; 348/313, 294, 308; 257/291, 292

[56] References Cited

U.S. PATENT DOCUMENTS

| | | | |
|---|---|---|---|
| 5,081,536 | 1/1992 | Tandon et al. | 348/313 |
| 5,083,016 | 1/1992 | Wyles et al. | 250/208.1 |
| 5,146,074 | 9/1992 | Kawahara et al. | 250/208.1 |
| 5,204,519 | 4/1993 | Nishihara et al. | 250/208.1 |
| 5,288,988 | 2/1994 | Hashimoto et al. | 250/208.1 |
| 5,296,696 | 3/1994 | Masayuki | 250/208.1 |
| 5,354,980 | 10/1994 | Rappoport et al. | 250/208.1 |
| 5,451,768 | 9/1995 | Hosier et al. | 250/208.1 |

*Primary Examiner*—Que Le
*Attorney, Agent, or Firm*—David K. Lucente; Wayne P. Bailey

[57] ABSTRACT

A picture element sensor circuit in an image array scanner is tested by driving a reset FET with a controllable voltage to set the reverse-bias voltage across the photo-diode at any selectable level of test voltage. In this way each pixel sensor circuit in the array may be tested as if it had received a desired amount of illumination. Alternatively, the drive voltage for the reset transistor is provided over the column output line. The controllable test voltage can be applied to the column line when no row access enable signal is applied to the array. In this situation the column line source follower circuit is inhibited by the row access FETs. Thus, a separate test voltage can be driven onto the column line, through a reset switch, and connected through the pixel sensor reset transistor to the pixel sensor photo-diode. The variable reset voltage, that is driven onto the column line, can be varied between ground and the normal bias voltage $V_{DD}$ for the pixel sensor by use of parallel connected P-channel FET and N-channel FET.

16 Claims, 2 Drawing Sheets

IMAGE SENSOR ARRAY WITH PICTURE ELEMENT SENSOR TESTABILITY

BACKGROUND OF THE INVENTION

1. Field of the Invention

This invention relates to an improved image sensor array. More particularly, the invention relates to such an image sensor array where each picture element sensor circuit in the array may be tested with controllable reset voltage signals applied to the photo-sensitive element in each sensor circuit.

2. Description of Related Art

Conventional focal plane image scanner arrays are tested in the same manner as they are used in the field. An image of specific light intensity is applied to the image scanner and each row of the image scanner is read out to measure the strength of the photoelectric signal detected by each picture element (pixel) sensor circuit at each pixel position. Accordingly in a two dimensional array of sensors, to test the sensors each row of the array must be illuminated at different illumination levels as desired for the test and each pixel sensor must be read out at each illumination level. As might be appreciated, this is a time-consuming process requiring precision in illumination as well as the normal precision in reading out signals from the array.

FIG. 1 illustrates a simple design for a conventional array. The array has columns A–N, and rows 1–n. Thus each pixel sensor circuit can be denoted by the column letter and the row number. Accordingly, the pixel sensor circuit at the second column and the second row would be denoted as B2.

Each of the pixel sensor circuits is connected to a column line 10, 12 or 14 in FIG. 1. Each column line is driven by the pixel sensor circuit, e.g., A1 on column line 10 through a load field effected transistor (FET) 16. The load FET is biased by a voltage. $V_L$ to provide a given resistance to the column line. The output of the pixel sensor circuit is taken off the column line and is the voltage drop across the load FET.

To read out this type of array the road access drivelines row 1 through row n are sequentially enabled. The output voltage across the load FET for each column line is then observed to detect the illumination that is sensed at the pixel sensor in that column for the row driven by the row access line which was enabled.

A simple pixel sensor circuit is illustrated as the A1 pixel sensor in FIG. 1. This pixel sensor operates by having the reset FET 18 enabled by the reset signal to bring the voltage at node 20 to $V_{DD}$ less the voltage drop across FET 18. $V_{DD}$ is typically 3–5 volts and the voltage drop across FET 18 is about 7/10 of a volt. Photo diode 22 is thus back biased by the voltage on node 20. As light shines on the photo diode 22, charge across the junction of the photo diode 22 leaks away and the voltage at node 20 drops. The voltage at node 20 after a given time of exposure to light on photo diode 22 is a measure of the light intensity detected by the photo diode 22.

FET 24 with the load FET 16 on column line 10 acts as a source follower circuit to output a voltage proportional to the voltage at node 20 on the output line 26 at load FET 16. Pixel sensor circuit A1 is selected by the ROW 1 signal enabling FET 28. Thus FET 28 is acting simply as a switch in the source follower circuit made up of FET 24 with a load resistance provided by the load FET 16. The small-signal gain of the source follower is about 0.85.

As just described, each of the pixel sensors in FIG. 1 in the past was tested by resetting each sensor and providing a different level of illumination in successive tests at each photo diode 22 in sensor array.

While this is workable, it is tedious and requires a good bit of precision control of the illumination provided during testing.

SUMMARY OF THE INVENTION

It is an object of this invention to provide an image sensor array structure that enables each pixel sensor circuit to be tested electrically with or without image illumination applied to the array.

In accordance with this invention, the above object has been accomplished by driving the reset FET with a controllable voltage to set the reverse bias across the photo diode at any selectable level of test voltage. In this way each pixel sensor circuit in the array may be tested as if it had received a desired amount of illumination.

As another feature of the invention, the drive voltage for the reset transistor is provided over the column output line. The controllable test voltage can be applied to the column line when no row access enable signal is applied to the array. In this situation the column line source follower circuit is inhibited by the row access FETs. Thus, a separate test voltage can be driven onto the column line, through a reset switch, and connected through the pixel sensor reset transistor to the pixel sensor photo-diode.

As yet a further feature, the variable reset voltage that is driven onto the column line can be varied between ground and the normal bias voltage $V_{DD}$ for the pixel sensor by use of parallel connected P-channel FET and N-channel FET.

The great advantage of this invention is that the pixel sensor circuit may be set to any back-bias voltage across the photo-diode and thus the circuit may be tested easily and quickly without the need for precisely controlled illumination of the pixel sensors. Another advantage of the invention when implemented by variable test voltage applied to the column line is that no additional voltage or test lines need to be built into the integrated circuit making up the image array scanner.

DETAILED DESCRIPTION OF PREFERRED EMBODIMENTS

Figure 2:
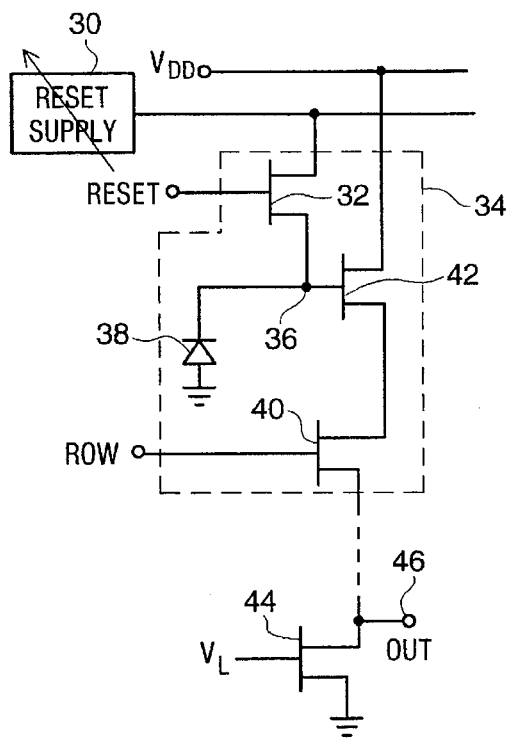
FIG. 2 is a schematic diagram of one preferred embodiment of the invention wherein the controllable test voltage is applied through the reset FET to back bias the photo diode.

In a first embodiment of the invention as shown in FIG. 2, a variable reset supply 30 is used to drive the reset FET 32 in each pixel sensor circuit 34. Now node 36 may be set to any voltage desired for testing the circuit based on control of the voltage from the reset supply 30. Photo diode 38 may be illuminated to test its operability; however, the preferred method for testing cell 34 would simply be to provide test voltages varying from ground to $V_{DD}$ at node 36 from reset supply 30.

Figure 4:
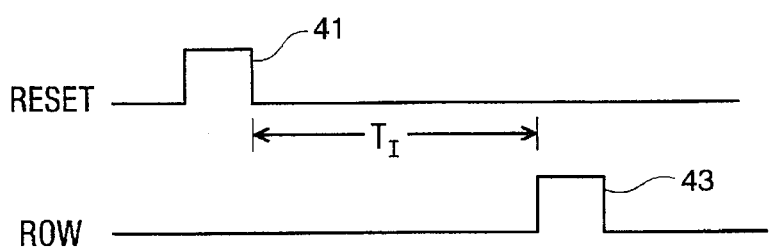
FIG. 4 is a timing diagram illustrating the relative timing between reset and row access signals used in FIGS. 2 and 3.

As depicted in FIG. 4, during each test cycle the reset signal 41 would enable the reset FET 32 to apply the test voltage from the reset supply 30 to the node 36. Some time interval $T_I$ later the row pulse 43 in FIG. 4 would enable the row FET 40. The source follower circuit made up of FET 42 and load FET 44 then produces an output voltage at node 46 which is proportional to the voltage at node 36. In this manner by applying a different reset supply test voltage at node 36 in each cycle of the reset and row pulses the operation of the pixel sensor circuit 34 can be tested for any voltage between ground and $V_{DD}$ as applied at node 36.

The time interval $T_I$ between the reset pulse 41 and the row pulse 43 can be used as an integration time for integrating light intensity applied to photo-diode 38 if there is a desire to test the photo-diode. However, in the preferred application of the circuit photo-diode 38 is not illuminated and different test voltages are directly applied from reset supply 30 through reset transistor 32 to node 36. In such a test operation the $T_I$ between pulses 41 and 43 can be made as short as possible and would typically be in the order of nanoseconds. The duration of the reset pulse 41 and the row pulse 43 is not critical other than it should be long enough to allow the voltages in the circuits to settle.

Figure 3:
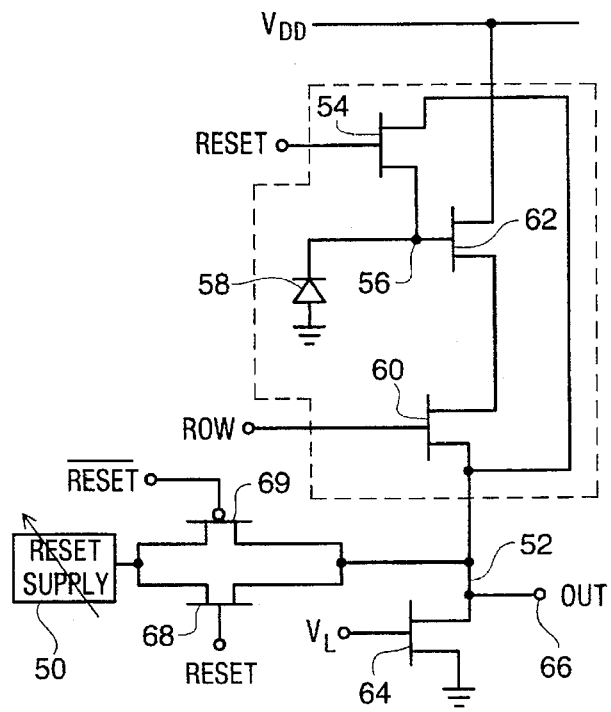
FIG. 3 is a schematic diagram of a pixel sensor circuit with its column line wherein the control test voltage is applied through the column line and the reset transistor.

In another embodiment of the invention in FIG. 3, the test voltage from the reset supply 50 is applied through the column line 52. Reset FET 54 is connected between the column line and node 56. The reset pulse 41 and the row access pulse 43 are separated by a time interval $T_I$ just as previously described for FIG. 2. Accordingly, when the reset pulse is present the reset supply voltage is applied to the column line 52 and through reset FET 54 to node 56. At this time the row access FET 60 is nonconductive. After the photo-diode 58 has been reversed biased by the test voltage being applied at node 56 during the reset pulse then the row access pulse 43 will enable the row FET switch 60 and the absence of the reset pulse will inhibit the reset supply switching transistors 68 and 69. Now the load FET 64 will be connected as the source follower circuit with FET 62 and the voltage at output node 66 will be proportional to the test voltage applied to node 56.

As explained above for FIGS. 2 and 4, the reset and row access pulses 41 and 43 can be used in the embodiment in FIG. 3 to provide illumination testing of photo-diode 58 by adjusting the time interval between pulse 41 and pulse 43 while applying illumination to the photo-diode. Alternatively, the time interval can be reduced substantially to zero and row pulse 43 extended. With maximum light applied to the photo-diode the output signal can be sampled at successive points in time. At each sample time the voltage across the photo-diode will have decayed to another voltage. Thus, the readout at each sample time can be readout of a new test voltage across the photo-diode in the sensor circuit. However, the preferred test for the embodiment in FIG. 3 is to cycle the reset and row pulses and in each cycle provide a different test voltage from the reset supply 50.

An additional feature in the embodiment in FIG. 3 is the use of parallel N-channel FET 68 and P-channel FET 69 to pass the reset supply voltage 50 to the column line 52. This configuration permits the test voltage to be set anywhere between ground and $V_{DD}$ irrespective of the drain-to-source drop in voltage across the FETs. In operation the voltage from ground to $V_{DD}$ minus the FET voltage drop is provided through the N-channel FET 68. Voltages between the voltage drop across the FET and $V_{DD}$ can be provided through the P-channel FET 69. Thus, by this parallel use of the N- and P-channel FETs, any voltage between ground and $V_{DD}$ can be applied to the column line and thus to the reset FET 54. The scope of the present invention is defined by the following claims.

Figure 1:
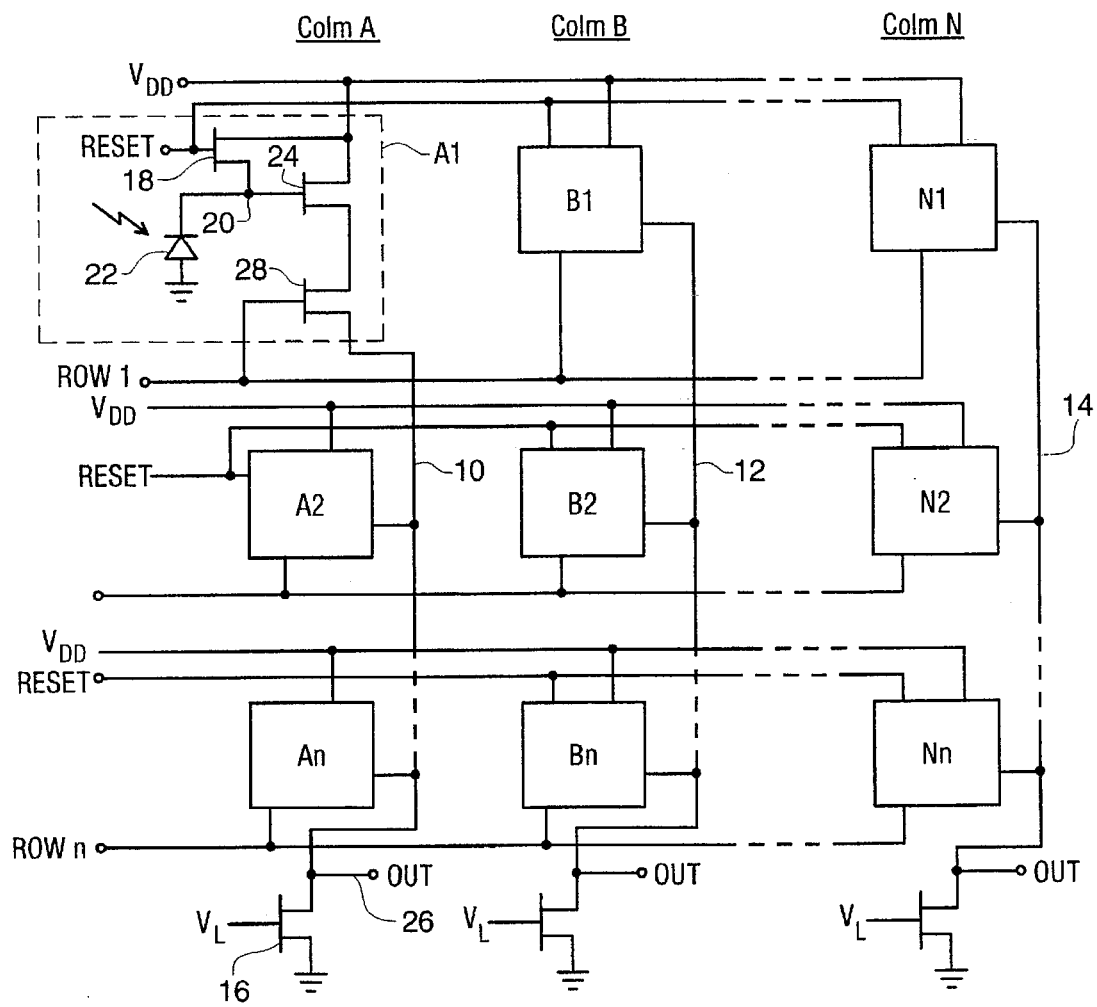
FIG. 1 illustrates a conventional image array focal plane scanner and a pixel sensor circuit in such an array.
Figure 5:
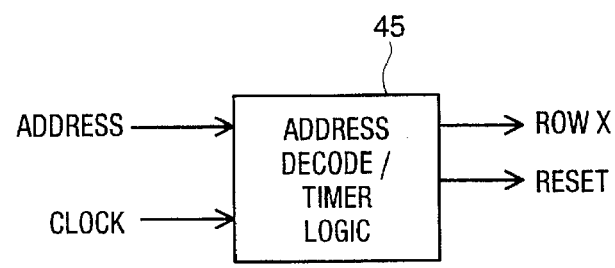
FIG. 5 is a block diagram of an address decode/timer logic that provides row signals and a reset signal in response to address and clock signals.

FIG. 5 is a block diagram of an address decode/timer logic that provides row signals and a reset signal in response to address and clock signals. The signal ROW X is applied to, for example, row FETs 40, 60 as shown in FIGS. 2 or 3. The RESET signal is applied to FETs 32, 54 as shown in FIGS. 2 and 3. Signals ROW X and RESET can control the circuits shown in FIGS. 2 and 3 as described hereinabove.

What is claimed is:

1. In a two dimensional, image scanner array having pixel sensor circuits arranged in rows and columns, apparatus for testing said pixel sensor circuits comprising:

a reset supply providing a source of selectable test voltages;

a reset device for resetting a voltage of a photo-sensitive device in a pixel sensor circuit to a test voltage from the reset supply; and a sensing circuit for sensing an output of the pixel sensor circuit in response to an application of the test voltage to the photo-sensitive device.

2. The apparatus of claim 1 and in addition:

a row access device for electrically connecting each pixel sensor circuit in a row to a column line for the pixel sensor circuit;

said reset device resetting the test voltage at a first time and said row access device connecting the pixel sensor circuit to the column line at a second time subsequent to said first time whereby the reset device and the row access device are repeatably cyclable to provide successive testing of the pixel sensor circuit.

3. The apparatus of claim 2 wherein said reset device comprises:

a switch for connecting the reset supply to the column line only during the presence of the reset signal; and a reset switch for setting a voltage from the column line to the photo-sensitive device only during the presence of the reset signal, wherein the test voltages are applied to the column line.

4. The apparatus of claim 3 wherein said switch comprises:

a p-channel semiconductive device in parallel with an n-channel semiconductive device to provide a switch to pass a full range of test voltages irrespective of voltage drops across each semiconductive device.

5. The apparatus of claim 1 wherein said reset means comprises:

a switch for connecting the reset supply to the column line only during the presence of the reset signal; and a reset switch for setting the voltage from the column line to the photo-sensitive device only during the presence of the reset signal, wherein the test voltages are applied to the column line.

6. The apparatus of claim 5 wherein said switch comprises:

a p-channel semiconductive device in parallel with an n-channel semiconductive device to provide a switch to pass a full range of test voltages irrespective of voltage drops across each semiconductive device.

7. A method for testing a focal plane image scanner array comprising the steps of:

a) providing a reset supply for a pixel sensor circuit for applying a selectable test voltage;

b) resetting a voltage across a photo-sensitive device in the pixel sensor circuit to the selectable test voltage;

c) driving the voltage across the photo-sensitive device onto an output line after the voltage across the photo-sensitive device has been reset to the selectable test voltage by said resetting step; and d) providing from the output line an output test signal proportional to the voltage across the photo-sensitive device.

8. The method of claim 7 further comprising the steps of:

e) switching the driving step off to electrically isolate the voltage across the photo-sensitive device from the output line;

f) said resetting step further applies the test voltage to the output line;

g) a switching step for applying the test voltage through the output line across the photo-sensitive device as the reset voltage; and h) after said switching step, inhibiting said switching step and enabling said driving step to drive the reset voltage onto the line whereby step d) provides an output test signal.

9. The method of claim 8 further comprising the steps of:

repeating steps e) through h) in successive test cycles;

changing the test voltage provided by said resetting step in each test cycle.

10. The method of claim 7 further comprising the steps of:

repeating steps b) through d) in successive test cycles;

changing the test voltage provided by said resetting step in each test cycle.

11. An image scanner array having a plurality of pixel sensing circuits, each pixel sensing circuit comprising:

a photo-diode back biased by a reset voltage;

a source follower field effect transistor circuit for driving an output signal proportional to an operative signal corresponding to the voltage across the photo-diode;

a reset voltage source for supplying as the reset voltage a test voltage;

a reset field effect transistor for applying the reset voltage to back-bias the photo-diode; and a timer for enabling first the reset field effect transistor to apply the test voltage as an operative voltage across the photodiode and thereafter for enabling the source follower circuit to drive an output signal proportional to the operative voltage.

12. The array of claim 11 wherein:

said timer cyclically repeats enabling the reset transistor and enabling the source follower circuit to provide a plurality of successive test cycles; and said reset voltage source supplies a different test voltage each test cycle.

13. The array of claim 11 and wherein the source follower circuit in a plurality of said pixel sensor circuits drives the output signal onto a common output line shared by said sensor circuits and said array further comprises:

said reset field effect transistor responsive to the timer for applying the reset voltage to the photo diode via the reset transistor and the common output line in a first time interval;

an access field effect transistor responsive to the timer for enabling the source follower circuit in a second time interval that follows said first time interval whereby the reset voltage may be applied via the common output line during the first interval and the output signal may be provided on the common output line during the second interval.

14. The array of claim 11 and wherein the source follower circuit from a plurality of said pixel sensor circuits drives the output signal onto a common output line shared by said sensor circuits and said array further comprises:

a reset switching circuit responsive to the timer for applying the reset voltage to the common output line in a first time interval;

said reset field effect transistor responsive to the timer for applying the reset voltage from the common output line to the photo diode during the first time interval;

an access field effect transistor responsive to the timer for enabling the source follower circuit in a second time interval that follows said first time interval whereby the reset voltage may be applied via the common output line during the first interval and the output signal may be provided on the common output line during the second interval.

15. The array of claim 14 wherein:

said timer cyclically repeats enabling the reset circuit and the reset transistor and enabling the source follower circuit to provide a plurality of successive test cycles;

said reset voltage source supplies a different test voltage each test cycle.

16. The apparatus of claim 14 wherein said reset switching circuit comprises:

a p-channel field effect transistor in parallel with an n-channel field effect transistor to provide a switch to apply a full range of test voltages to the common output line irrespective of voltage drops across the p-channel field effect transistor and the n-channel field effect transistor.

* * * * *